(12) United States Patent
Fischer

(10) Patent No.: US 9,680,647 B2
(45) Date of Patent: Jun. 13, 2017

(54) METHOD OF USING A TOKEN IN CRYPTOGRAPHY

(71) Applicant: Infineon Technologies AG, Neubiberg (DE)

(72) Inventor: Wieland Fischer, Munich (DE)

(73) Assignee: Infineon Technologies AG, Neubiberg, DE (US)

( * ) Notice: Subject to any disclaimer, the term of this patent is extended or adjusted under 35 U.S.C. 154(b) by 64 days.

(21) Appl. No.: 14/223,308

(22) Filed: Mar. 24, 2014

(65) Prior Publication Data

US 2015/0270965 A1    Sep. 24, 2015

(51) Int. Cl.
*H04L 9/00* (2006.01)
*H04L 9/30* (2006.01)
*H04L 9/08* (2006.01)

(52) U.S. Cl.
CPC ............ *H04L 9/302* (2013.01); *H04L 9/0869* (2013.01); *H04L 2209/24* (2013.01)

(58) Field of Classification Search
CPC .... H04L 2209/24; H04L 9/0869; H04L 9/302
USPC .......................................................... 380/28
See application file for complete search history.

(56) References Cited

U.S. PATENT DOCUMENTS

| | | | | |
|---|---|---|---|---|
| 5,850,450 A * | 12/1998 | Schweitzer | ............. | G06F 7/588 345/503 |
| 6,307,938 B1 * | 10/2001 | Matyas, Jr. | ............... | G06F 7/72 380/44 |
| 7,149,763 B2 * | 12/2006 | Joye | .......................... | G06F 7/72 708/250 |
| 8,111,826 B2 * | 2/2012 | Takashima | .............. | G06F 7/725 380/28 |
| 2008/0279373 A1 * | 11/2008 | Erhart | ..................... | H04L 9/302 380/46 |
| 2010/0063932 A1 * | 3/2010 | Camenisch | ........ | G06Q 20/3821 705/76 |
| 2013/0051552 A1 * | 2/2013 | Handschuh | ........... | G06F 21/602 380/44 |
| 2015/0063565 A1 * | 3/2015 | Ansari | .................. | H04L 9/3033 380/44 |

* cited by examiner

*Primary Examiner* — Samson Lemma
(74) *Attorney, Agent, or Firm* — Murphy, Bilak & Homiller, PLLC

(57) ABSTRACT

Disclosed herein are techniques related to predetermining a token for use in a cryptographic system. A method includes providing a memento, mapping the memento to a candidate token according to a rule that updates a parameter, predetermine the token to be the candidate token, if the candidate token meets a test condition according to the rule, identifying a parameter value of the parameter, and providing the memento and the parameter value for future use as an input to re-generate the token. Another method disclosed herein is to re-generate the predetermined token for use in a cryptographic system. The method includes providing a memento associated with the predetermined token, providing a parameter value associated with the predetermined token, and providing a precept for mapping the memento to a candidate token. Further disclosed is instruction code for performing the techniques disclosed herein.

9 Claims, 15 Drawing Sheets

METHOD OF USING A TOKEN IN CRYPTOGRAPHY

TECHNICAL FIELD

Embodiments disclosed herein relate to techniques of using a token in cryptography. Some techniques relate to generating digital representations of large numbers.

BACKGROUND

In asymmetric cryptography, secret large prime numbers are needed. In many cryptographic applications, prime numbers should be random. Conventionally, generating random prime numbers is a process that requires significant resources in terms of processing power and time. Typically, time can be saved by increasing the processing power applied to the task of generating the random prime number. Where both time and processing power are scarce, a solution may be to predetermine the random prime number under circumstances where time and processing power are less scarce and store the predetermined random prime number for later use. The storing of the random prime number for later use, however, adds to a risk of compromising the security of the random prime number.

A typical cryptographic application is Rivest Shamir Adleman (RSA) cryptography. RSA requires two secret randomly selected or generated prime numbers P and Q. Herein, randomly selected or generated refers to a level of entropy of the number that, in the randomly selected or generated number, is sufficient for the purpose why the number was selected or generated in the first place. In the conventional method the two secret prime numbers P and Q are multiplied to form a public module $N=P*Q$. A pair of keys, i.e., a private or secret key D plus a public key E, is then given by the condition of $E*D=1 \bmod phi(N)$, wherein $phi(N)=(P-1)*(Q-1)$ is Euler's totient function that counts the totatives of N, i.e., the positive integers less than or equal to N that are relatively prime to N. In a typical cryptographic application, first a suitable public key E is selected and then private key D is calculated by inversion of E mod phi(N). Thus, $D=E^{-1} \bmod (P-1)*(Q-1)$.

Security of RSA cryptography rests on the difficulty of factorization of the public parameter N. Having accomplished the factorization, an attacker can then calculate Euler's function phi(N) and, using $D=E^{-1} \bmod phi(N)$, obtain private key D from public key E. Having private key D, the attacker can do whatever the rightful owner of private key D is able to do. RSA is secure to the extent that, at least for large N, calculation of secret prime factors P and Q is difficult. Accordingly, an attacker should be prevented from obtaining P and/or Q.

Given that factorization is difficult only for large N, in order to ensure security, primes P and Q need to have a minimum size that, however, isn't fixed but increases over time in step with technological advance and increasing processing power available to an attacker. Presently, for P and Q to be secure, these numbers should be larger than $2^{1024}$. Further, P and Q need to be random and have a certain level of entropy, i.e., a certain level of uncertainty and unpredictability, such that an attacker cannot guess the numbers. Presently, for P and Q to be secure, these numbers should have an entropy of at least 100 bit. In other words, a random number generator used in a method to generate P and Q should be able to generate at least $2^{100}$ different prime numbers. Thus, an attacker who is not able to perform a factorization of N, should on average test $2^{99}$ prime numbers in order to find P and/or Q. To give one example, if P did merely have an entropy of 32 bit, then an attacker could generate a set of all $2^{32}$ prime numbers and test, if any candidate prime number C in the set divides public value N. Having thus identified C|N, P and Q would be found as P=C and Q=N/C.

Conventional methods to generate secret prime numbers, at a step 1, generate a random candidate number C, at a step 2, test candidate number C to determine, if candidate number C is prime, and, at a step 3, if C is not prime, go on to generate another candidate number C', test that candidate number C=C', and so forth, until C is found to be prime, in which case C, at a step 4, is output as prime number P. Random candidate number C can be generated using a true random number generator (TRNG) or a pseudo random number generator (PRNG), wherein the PRNG is a state machine holding a state with a certain bit length that derives, from the state, both the pseudo random number and an updated state to hold for further use. Typically, at the beginning of operation, the PRNG is set to an initial state that is based on a random secret, called "seed". Any subsequently generated pseudo random number depends deterministically on the seed. The level of entropy of any subsequently generated pseudo random number is upper-limited to the level of entropy of the seed. Some generators operate as hybrids of TRNG and PRNG.

A typical test for primality of a candidate number, for example, the Pocklington-Lehmer test, can be used. The Pocklington-Lehmer test uses auxiliary parameters such as pre-generated small prime numbers. The small prime numbers can add to the entropy of the generated candidate number. Other typical tests for primality of a candidate number are probabilistic tests that determine so-called pseudo prime numbers. Examples of probabilistic tests are Fermat test, Solovay-Strassen test, and Miller-Rabin test. Probabilistic tests can differentiate between a number being a prime number and the number being composed, i.e., non-prime, wherein the test result may be subject to some statistical error. Statistical error can provide a result where a composed number is found to be prime even though the number is actually non-prime. Today, applications can provide for an error probability less than one in $2^{100}$ and thus be negligible. Therefore, herein reference is made collectively merely to the term "prime numbers". Primality tests can be combined. For example, a small prime divisability test can precede a Miller-Rabin test. Performing the small prime divisability test takes little time and thus brings about efficiencies. For example, using the smallest 54 prime numbers to perform the small prime divisibility test on the candidate number can reduce by up to 90% the number of Miller-Rabin tests that need to be performed. In the afore-described conventional method to generate prime numbers, upon performing the conditional jump from step 3 to step 1, a subsequent candidate number does not necessarily need to be generated all anew, but can be derived from an existing candidate number C. Typical methods to generate the first candidate number C encompass: selecting C=true random number; using a seed as an input to a pseudo random number generating function to provide C=pseudo random number. The pseudo random number can be C=f(seed), or an existing random number rand=f(seed) can be used as an input to a generating function to provide C:=g(rand). In some applications the function f can have cryptographic properties. For example, f can be a hash function. In another example, f is a block cipher such as defined in the Advanced Encryption Standard (AES). Subsequent candidates C can be generated in several ways. A typical method is to derive a subsequent candidate number from a previous candidate number, C:=g(C), for example by incrementation, C:=C+D, wherein D denotes an increment step value, by hashing, C:=hash(C), by adding a random number C:=C+R, wherein R denotes a random value, by combination of these, C:=hash(C+R), and others. Subsequent candidates can also be derived by not depending on one another, C=f(S, i), wherein S denotes a seed value and i denotes, e.g., a counter value. The counter value can be an independent parameter such as several random numbers generated earlier.

Generating prime numbers, for at least two reasons, takes a lot of time: Firstly, according to the prime number theorem, probability of a random number to be prime is approximately $1/(n*\ln(n))$, wherein n denotes the number of bits used in representing the random number, herein also referred to as bit length. To give an example, probability of a random number having a representation of bit length n=1024 to be prime is approximately 1/710, meaning that in order to determine a prime number, on average, the primality test needs to be performed on 710 random numbers. Secondly, given a candidate number of bit length n, the primality test typically requires at least one exponentiation of (almost) n bit length. For example, when applying the Fermat test on the candidate number C, a random or predetermined number a is exponentiated according to the expression $a^{(C-1)}$ mod C. Even when using the small prime divisibility test before applying another one of the above mentioned primality tests, still the other primality test needs to be performed 71 times on average. In contrast, generating a random candidate number, in typical applications, is fast.

One concern in cryptographic systems is side channel attacks, i.e., attacks based on information gained from the physical implementation of a cryptosystem. For example, timing information, differential power consumption, electromagnetic leaks or even sound can provide an extra source of information which can be exploited to break the system. In key generation for RSA cryptography, however, side channel attacks are less of a concern than in other applications, since side channel attacks require repeated use of the secret in a cryptographic algorithm, in order to enable the attacker to break the secret. A typical side channel attack may require information on the result of performing the algorithm. In the case of secret key generation, however, the result is the secret key, and therefore not readily available to the attacker who, at any rate, typically has but one performance of the algorithm to observe information in the side channel. The scarcity of information in the side channel makes the generation of secret keys rather resilient to side channel attacks.

In some applications a cryptosystem may provide little permanent memory such as non-volatile memory relative a number of secret keys to be kept by the cryptosystem. For example, embedded systems such as typically used in a chipcard or in a trusted platform module (TPM, which is a specification for a secure cryptoprocessor written by a computer industry consortium called the Trusted Computing Group (TCG)) have rather limited resources at their disposal. In this situation it is a good solution to use a deterministic prime number generation, i.e., one that only depends on a secret seed value, and re-generate the prime number when it is needed. In this case, instead of storing a long bit representation of prime P, it suffices to store the seed whose bit length can be limited to the bit length of the entropy required in the random prime number(s) for use in the implementation. For example, where a random prime number whose representation has a bit length of 1024 bit is required to have entropy of 100 bit, savings in memory of above 90% can realised by storing the seed instead of the random prime number.

In some implementations time to regenerate the random prime number can be a concern. In particular, in RSA, time used for number regeneration can matter, since two prime numbers P and Q need to be regenerated. Therefore, there is a need to accelerate regeneration of prime numbers.

In some implementations side channel attacks can be a concern. Given that a same prime number is generated more than once, an attacker, for example, by repeatedly running a regeneration process may create opportunities to observe information in the side channel that eventually is sufficient to break the secret and determine the secret prime number. Side channel attacks can be a particular concern in primality tests where exponentiation is performed using the candidate number C such as, for example, the Fermat test that performs $a^{(C-1)}$ mod C. Typically, the exponentiation is performed by applying a square and multiply algorithm whose steps closely correlate with the candidate number C submitted to the test, and that enable an attacker to break the secret bit by bit.

SUMMARY

The following presents a simplified summary in order to provide a basic understanding of one or more aspects of techniques disclosed herein. This summary is not an extensive overview, and it is neither intended to identify key or critical elements, nor to delineate the scope of this disclosure. Rather, the primary purpose of the summary is to present some concepts in a simplified form as a prelude to the more detailed description that is presented later.

This disclosure is directed to techniques of predetermining a token for use in a cryptographic system. The techniques can encompass providing a memento and a rule for mapping the memento to a token. As an example, the techniques can be applied in asymmetric cryptography to generate a same large prime number more than once. A variant of the techniques can also be used to preserve a predetermined large number. Yet a further variant of the techniques disclosed herein can be used to provide a predetermined number for use in an application.

This summary is submitted with the understanding that it will not be used to interpret or limit the scope or meaning of the claims. Those skilled in the art will recognise additional features and advantages upon reading the following detailed description, and upon viewing the accompanying drawings.

BRIEF DESCRIPTION OF THE DRAWINGS

The claimed subject matter is described below with reference to the drawings. For purposes of explanation, numerous specific details are set forth in order to provide a thorough understanding of the claimed subject matter. It may be evident, however, that the claimed subject matter may be practiced without these specific details. The detailed description references the accompanying figures. The same numbers are used throughout the drawings to reference like features and components. Where multiple embodiments are described, multi-digit reference numerals are used to denote elements in the embodiments. In multi-digit reference numerals the least significant digits can reference features and components that are alike in the different embodiments, whereas the most significant digit can reference the specific embodiment.

DETAILED DESCRIPTION

Described herein are embodiments that relate to processing signals and/or data in a system according to techniques disclosed herein. For purposes of explanation, numerous specific details are set forth in order to provide a thorough understanding of the claimed subject matter. It may be evident, however, that the claimed subject matter may be practiced without these specific details.

Figure 1:
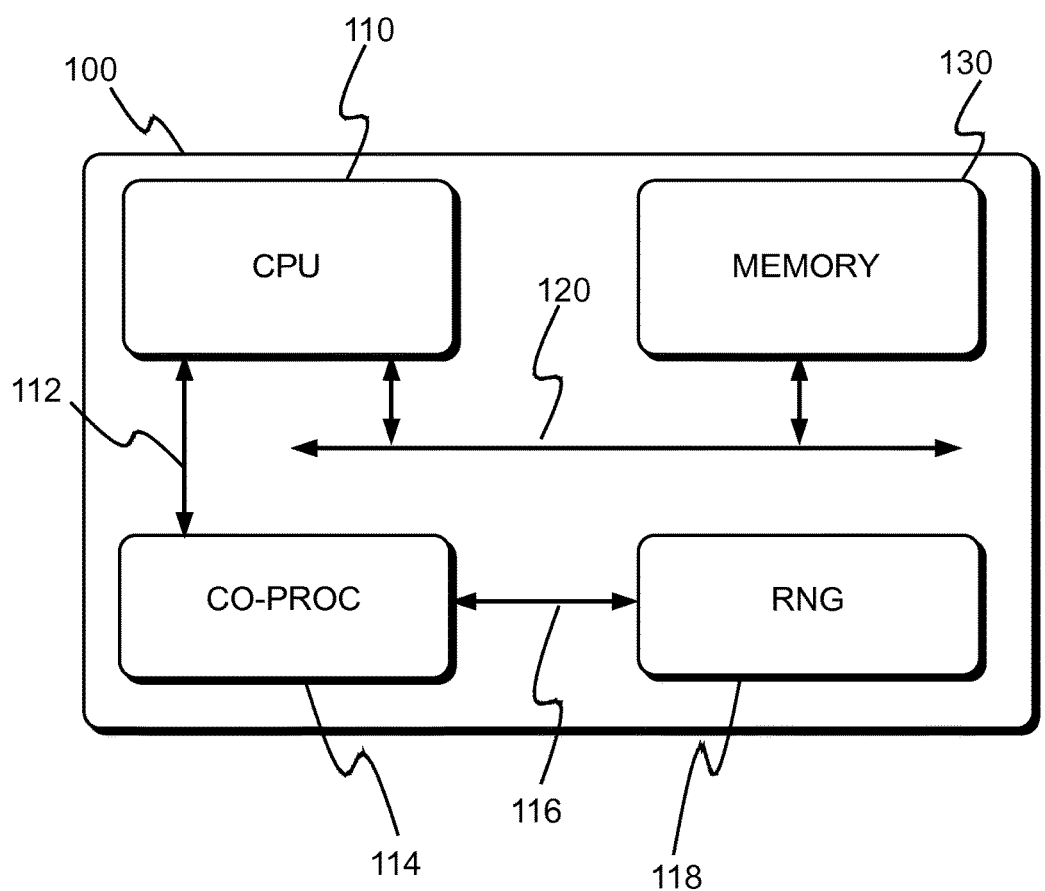
FIG. 1 illustrates an exemplary embodiment of hardware configured to implement techniques disclosed herein.

FIG. 1 illustrates an exemplary embodiment of hardware configured to implement techniques disclosed herein. Hardware can, for example, be provided as a module 100 for use in a chipcard. In some embodiments module 100 includes a central processing unit (CPU) 110 that is coupled to a bus 120 for communication of instructions and/or data within module 100 and, in some embodiments, via an interface (not shown in FIG. 1) also beyond the confines of module 100. Module 100 can comprise a memory unit 130 that is also coupled to bus 120. In some embodiments, at least a portion of memory unit 130, or if memory unit 130 is segmented, at least a segment of memory unit 130, may also form part of CPU 110. CPU 110 may be configured to perform techniques and cryptographic operations disclosed herein. In some implementations, module 100 further includes a co-processor 114 adapted to perform cryptographic operations and coupled to CPU 110, for example, by a processor bus 112. In some implementations, co-processor 114 can be coupled to CPU 110 by bus 120. Further, module 100 includes a random number generator 118 coupled to co-processor 114 by direct line 116. Other modes of coupling random number generator 118 to co-processor 114 can also be contemplated, for example, by processor bus 112 of bus 120. In some embodiments CPU 112 is adapted to generate random numbers and, thus, in these embodiments random number generator 118 forms part of CPU 112.

Figure 2:
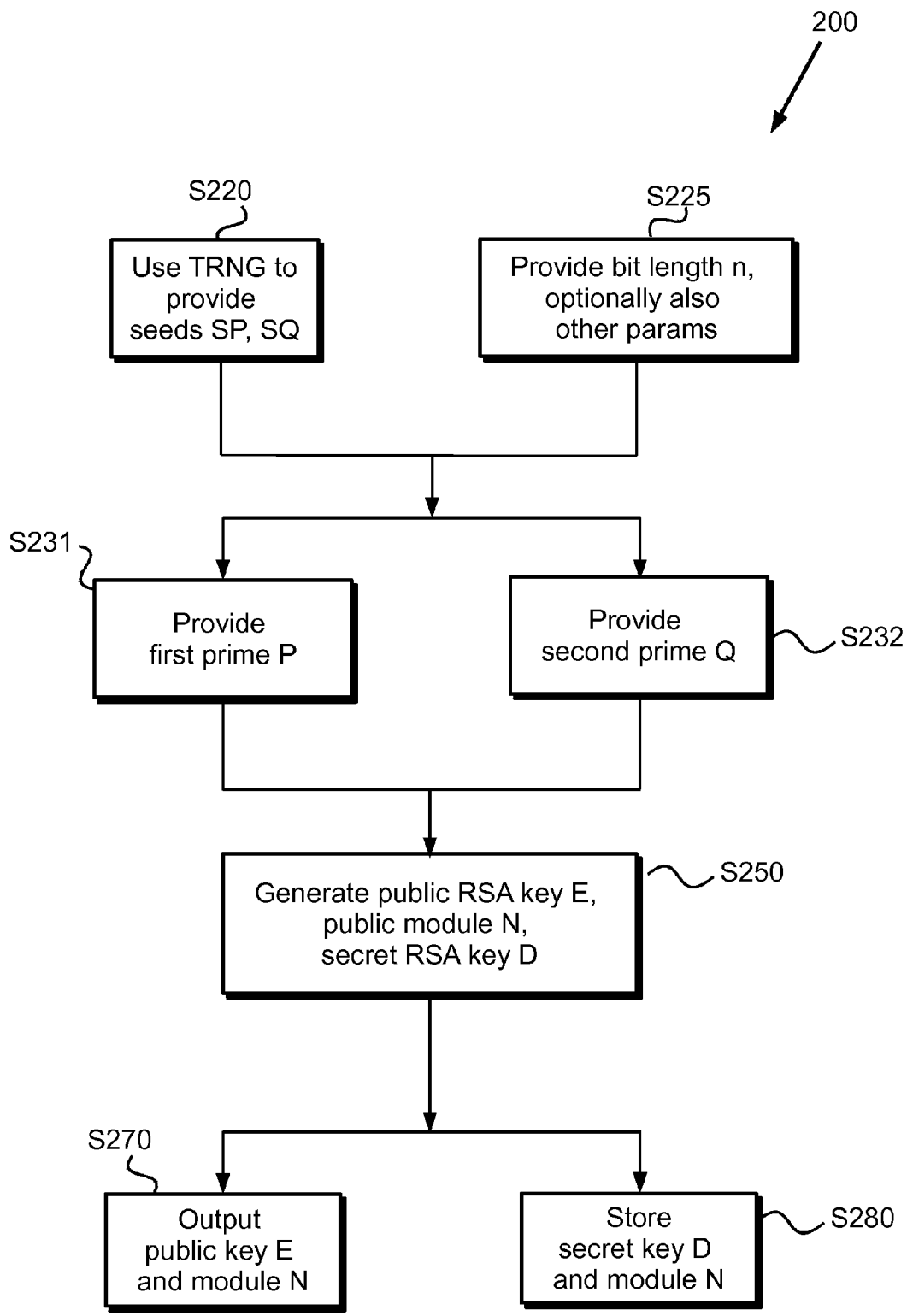
FIG. 2 is a flow chart that illustrates an exemplary RSA key generation.

FIG. 2 is a flow chart that illustrates an RSA implementation. Illustrated in FIG. 2 is a method 200 for providing a secret key D as a token for use in cryptography. More particularly, secret key D is to be used as a private key for signing messages M. In some embodiments secret key D can be used in decrypting a message C that was encrypted using a public key E associated with secret key D as described above. It should be understood that single letter names or variable names, such as D and E, given to keys or to other values are given and used herein merely to facilitate reading and understanding of embodiments described herein. In no way should these names as such be used to interpret the claims or otherwise be understood as a limitation. In particular, it should further be understood that a key referenced by a single letter name or variable name can encompass multiple components that, in some embodiments, are separable from one another.

Method 200 is to be performed using a chipcard that includes, merely by way of example, module 100 having processor 110 configured to execute instructions provided, for example, from memory 130 also comprised in module 100 or otherwise be coupled to processor 110. In some embodiments, as described above, Module 100 can also include co-processor 114 configured to perform cryptographic operations. In some embodiments, module 100 further includes random number generator 118. The chipcard processing module can include a processor and/or a cryptographic co-processor and thus be configured to generate the secret key D.

At S220, random generator 118 generates a true random bit pattern to provide seed S. In a RSA implementation at least a first seed SP and a second seed SQ are provided. However, in some implementations the random bit pattern is used to determine only a first seed SP and, depending on the first seed SP, a second seed SQ is derived from the first seed SP, wherein a dependency can be predetermined by some function forming part of the rule set. Herein, first seed SP and second seed SQ are collectively referred to as seed S.

At S225, co-processor 114 or, in some implementations, CPU 110 provides values of other parameters such as bit length n of a bit representation, herein after also referred to as "token bit length". In some implementations the RSA key length, i.e., the bit length of N is also provided. It should be understood that a bit length n defines a value of a number represented by a bit representation of length n to be smaller than the value $2^n$ and, typically, to lie in an interval $[2^{(n-1)}, 2^n]$.

At S231, co-processor 114 can use seed SP or, in another implementation (not shown in FIG. 2), the generated random value, as an input to generate key elements such as a first prime number P as will be described in detail below. Similarly, at S232, seed SQ is used to generate second prime number Q.

At S250, co-processor 114 generates and/or calculates public RSA key E, private RSA key D and public module N using first prime P and second prime Q in the process.

At S270, co-processor 114 transmits public key E to CPU 110. Using bus 120, CPU 110 can output public key E and public module N from module 100.

At S280, CPU 110 can further use bus 120 to provide private key D to memory 130, for example, to write private key D to a secure portion of memory 130. Also CPU 110 can write public module N to memory 130.

Figure 3A:
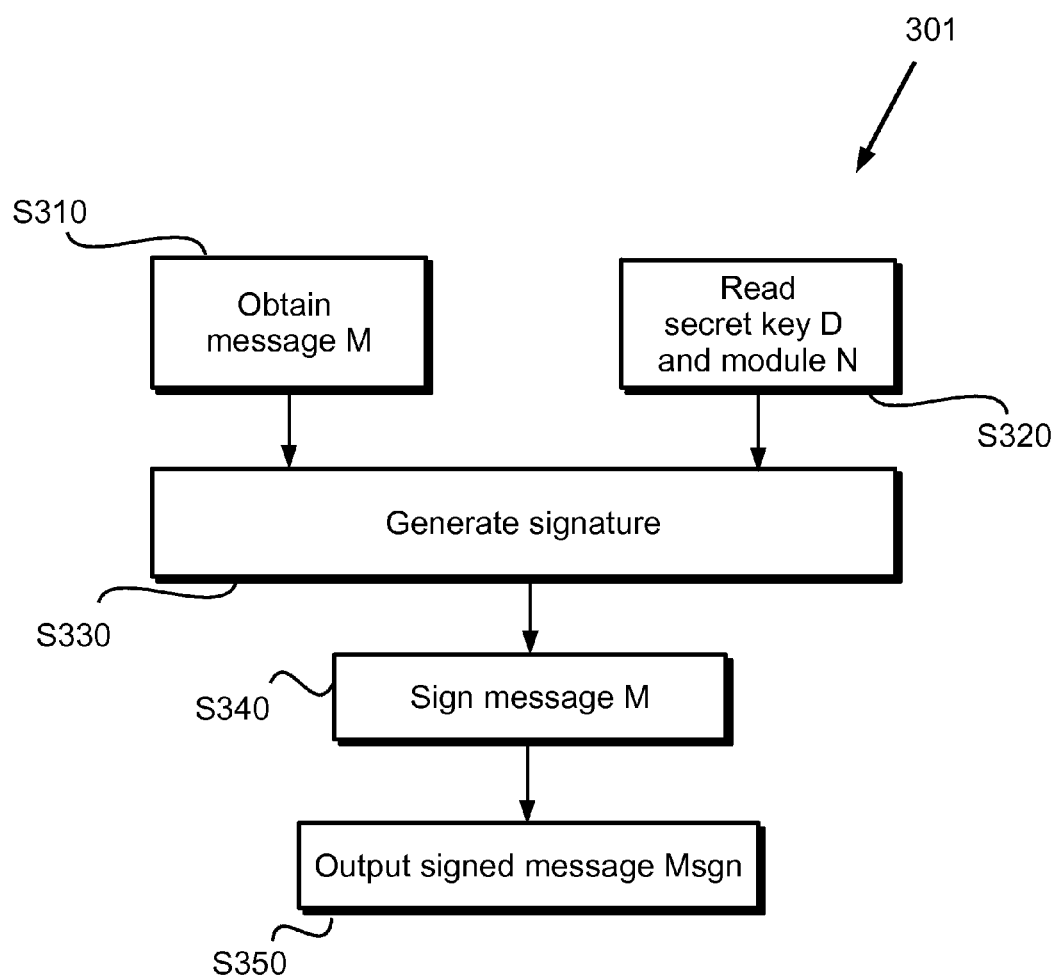
FIGS. 3A and 3B are flow charts that illustrate exemplary RSA implementations according to some embodiments, wherein the key was generated according to the exemplary method of FIG. 2.

FIG. 3A is a flow chart that illustrates an exemplary method 301 of using cryptographic key D and module N provided at a correspondent in accordance with the method of FIG. 2 to sign a message M so as to obtain a signed message. At S310, message M is obtained. At S320, components such as secret key D and module N are read, for example, from memory 130. At S330, secret key D is determined to be provided for use in RSA cryptography. Still at S330, message M is used to obtain a signature. At S340, using the signature, message M is signed to obtain a signed message Msgn. At S350, the signed message is output, for example, for transmission to another correspondent.

Figure 3B:
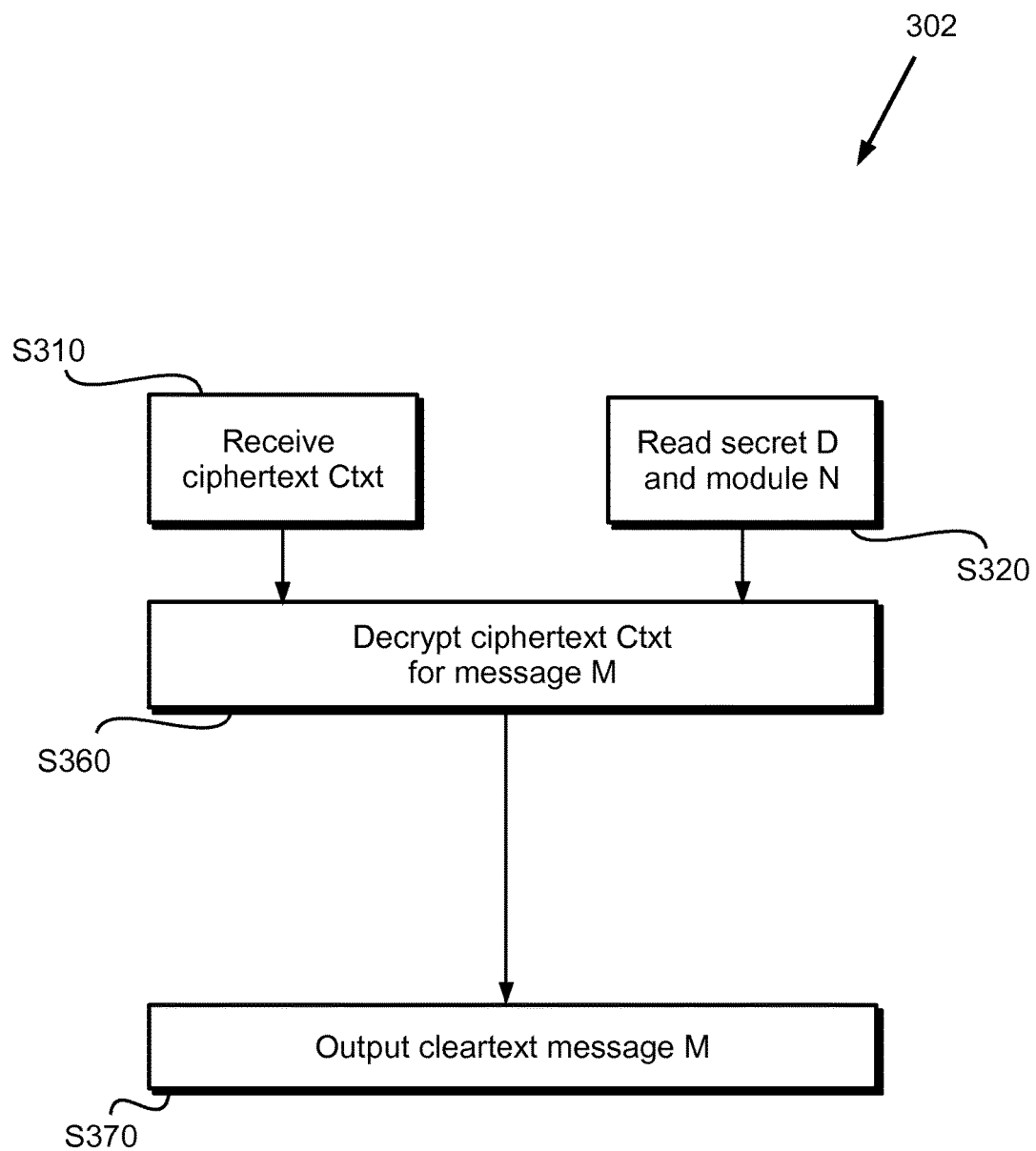

FIG. 3B is a flow chart that illustrates an exemplary method 302, at least in part similar to method 301, of using cryptographic key D and module N provided in accordance with the method illustrated in FIG. 2 to decrypt an encrypted message C. At S310, a correspondent receives encrypted message C from another correspondent. At S320, secret key D and module N are obtained, for example, by being read from memory 130. At S360, encrypted message, i.e., ciphertext Ctxt, is decrypted to obtain a cleartext message M. At S370, the cleartext message is output, for example, to the correspondent for reading.

Figure 4:
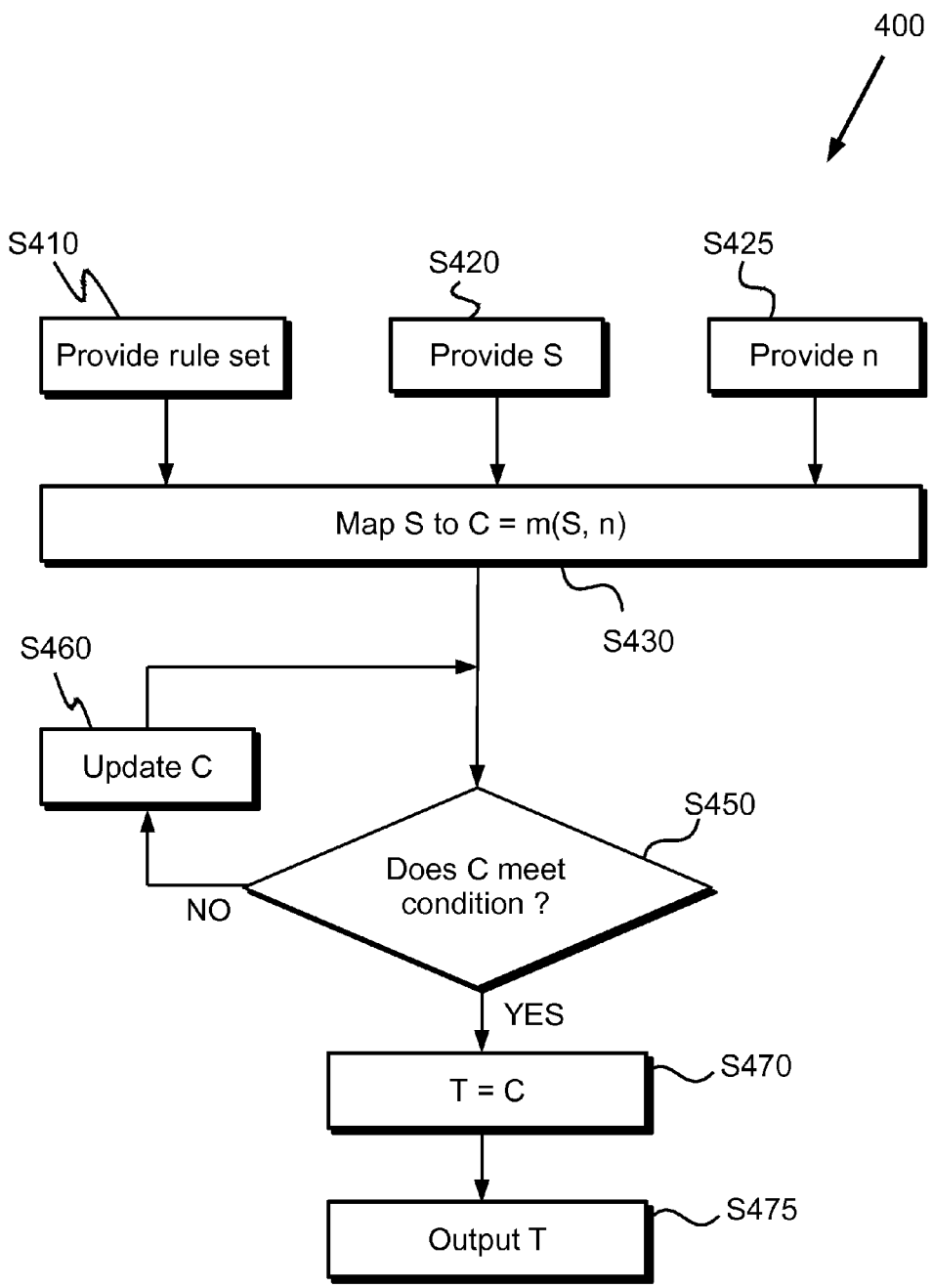
FIG. 4 is a flow chart that illustrates an exemplary method for providing a token according to some embodiments.

FIG. 4 illustrates, in detail, an exemplary method 400 to determine a token T according to some embodiments. In some embodiments method 400 is implemented in the cryptographic methods described above using module 100.

At S410, a rule set is provided, herein also shortly merely referred to as "rule", that governs the generation of token T such that for a given memento, seed S, performance of method 400 to obtain token T is deterministic. In some implementations the rule set is predefined in hardware or in software. For example, the rule set could be provided in hardware, i.e., logic circuitry, or in a compiled software provided in memory 130. In some embodiments a user defines the rule set in accordance with the users application and/or other needs. In some implementations the rule set includes a bit length n of a bit representation of token T. The rule set can include that token T be random. The rule set can define that the memento should be random and used as a seed to derive a bit representation of bit length n; herein reference is therefore made to seed S, but it should be understood that some embodiment could also use as the memento any piece of information other than a randomly generated seed. In some embodiments the rule set defines that a candidate token C be derived from the memento and further includes a condition that candidate token C must meet in order to be confirmed as token T. For example, the condition can be defined such that token T be prime.

At S420, random generator 118 generates a true random bit pattern to provide memento S. As shown above with reference to FIG. 2, in an RSA implementation, a first prime P and a second prime Q are generated. Therefore, at least a first seed SP and a second seed SQ are needed. In some implementations the random bit pattern of memento S is used to determine only a first seed SP and, depending on the first seed SP, a second seed SQ is derived from the first seed SP, wherein a dependency can be predetermined by some function forming part of the rule set. Herein, first seed SP and/or second seed SQ are collectively referred to as memento S, and it should be understood that, where first prime P and second prime Q are needed, i.e., where two tokens T are needed, the method described below is performed twice.

At S425, co-processor 114 or, in some implementations, CPU 110 provides values of other parameters such as bit length n of a bit representation, herein after also referred to as "token bit length". In some implementations the RSA key length, i.e., the bit length of public module N, of first prime number P and/or of second prime number Q is also provided. It should be understood that a bit length n defines a value of a number represented by a bit representation of length n to be smaller than the value $2^n$ and, typically, to lie in an interval $[2^{(n-1)}, 2^n]$.

At S430, using a deterministic property of a mapping rule, seed S is "mapped" to a candidate token C=m(S, n), wherein m can be a function using S and n as inputs. Where a bit representation of seed S is shorter than bit length n, mapping can include expanding the bit representation of seed S to a bit length equal to bit length n. In some implementations n is defined in the rule set; other sources for providing n can be also be contemplated. In one example, seed S is used as an AES key to encrypt an arbitrary text or other data block. To obtain the candidate token C, a portion of bit length n can be cut, in one piece or in several pieces, from AES-encoded ciphertext Ctxt. In the unlikely event that the bit representation of seed S is longer than bit length n, mapping can include reducing the bit representation of memento S to a bit length equal to bit length n, for example by cutting most significant bits of the memento's bit representation.

At S450, candidate token C is tested against the condition defined in the rule set. For example, if the condition is that token T be prime, candidate token C is submitted to a primality test as discussed above.

If candidate token C, at S450, does not pass the test, then, at S460, candidate token C is updated in accordance with the rule to form an updated candidate token. The updated candidate token is expressed in pseudo code, C:=f(C), wherein f is some function defined by the rule. In some embodiments, the function is defined such that candidate token C is incremented to a larger integer value. For example, where the condition is that the token be prime, candidate token C can be incremented to a next larger odd integer value. The skilled person can implement other update procedures that, for example, use decrementing instead of incrementing. In some implementations updating of candidate token C can encompass using, with each update, seed S. In some implementations updating of candidate token C can encompass using the first candidate token plus some update parameter. The parameter's value can be modified with each update to form updated candidate token C. The updated candidate token is fed back for a new round of testing at S450. Rounds of testing the candidate token, updating the candidate token to obtain another updated candidate token and feedback of the new candidate token, are performed until the condition of the updated candidate token being determined to be prime is met, whence, at S470, the new candidate token is output as token T or prime number P for further processing.

If, at S450, candidate token C passes the test, at S470, candidate token C is confirmed as token T and, at S475, candidate token C is output as token T for processing to be continued. It should be understood that the confirmation and/or the output can also be implicit, for example, by providing candidate token C as input token T for use in further processing.

Figure 5:
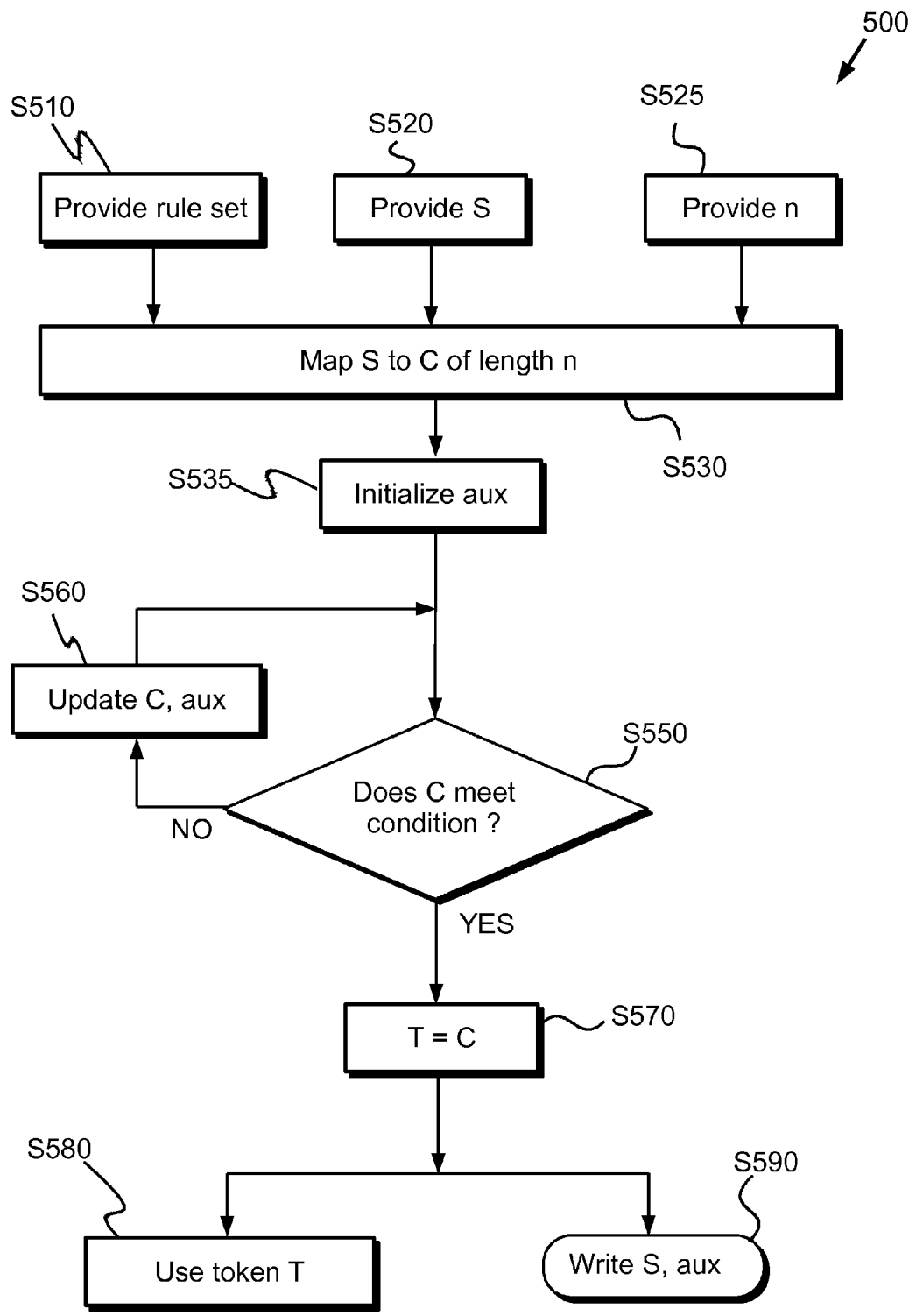
FIG. 5 is a flow chart that illustrates an exemplary method to determine a token T according to some embodiments.

FIG. 5 illustrates a method 500 to determine a token T according to some embodiments. Method 500 is a variant of method 400 illustrated in FIG. 4. Method 500 includes the steps of method 400 described above with reference to FIG. 4. In addition, at S535, method 500 includes initializing of an auxiliary parameter aux.

In some embodiments, at S560, in addition to updating candidate token C, also auxiliary parameter aux is updated to obtain updated auxiliary parameter aux:=g(aux). At least one effect of the updating of auxiliary parameter aux is to establish and maintain a correlation wherein updated auxiliary parameter aux correlates with a number of candidate tokens C hitherto tested or with a number of iterative tests performed to obtain updated candidate token C. In some embodiments, auxiliary parameter aux is incremented to a larger integer value. For example, auxiliary parameter aux is incremented by 1, i.e., g(aux):=aux+1. An implementation where values are decremented can also be contemplated. In order to achieve a predetermined sequence of unique transformation results, in another implementation, auxiliary parameter aux is modified in a shift register.

At S580, using token T secret key D can be derived for use and/or storage. It should be understood that for the sake of simplicity, reference is made to generating merely a single token. However, this reference to a single token, where a plurality of tokens may be required, is to be understood as a collective reference. For example, in accordance with the method illustrated in FIG. 2, for RSA, two primes may need to be generated. In that case selected steps of the method may need to be performed anew for each token. For example, mapping seed S to candidate token C may need to be independently performed twice in order to provide two candidate tokens independent from each other for further performing, independently for each of the two candidate tokens, testing at S450, and so forth, such that the two primes are generated independently from each other to form two tokens that are independent from each other. In some implementations, at S590, the memento, i.e., in the described embodiment seed S, and/or auxiliary parameter aux are written, for example to memory 130, to be stored for later use. It should be understood that, in some embodiments, storing does not necessarily require any particular write operation to take place, to the extent that the values, i.e., bit representations, of the memento and the auxiliary parameter are already stored at an address where these values can later be read when needed, in particular, when needed to regenerate token T as will now be described.

Figure 6A:
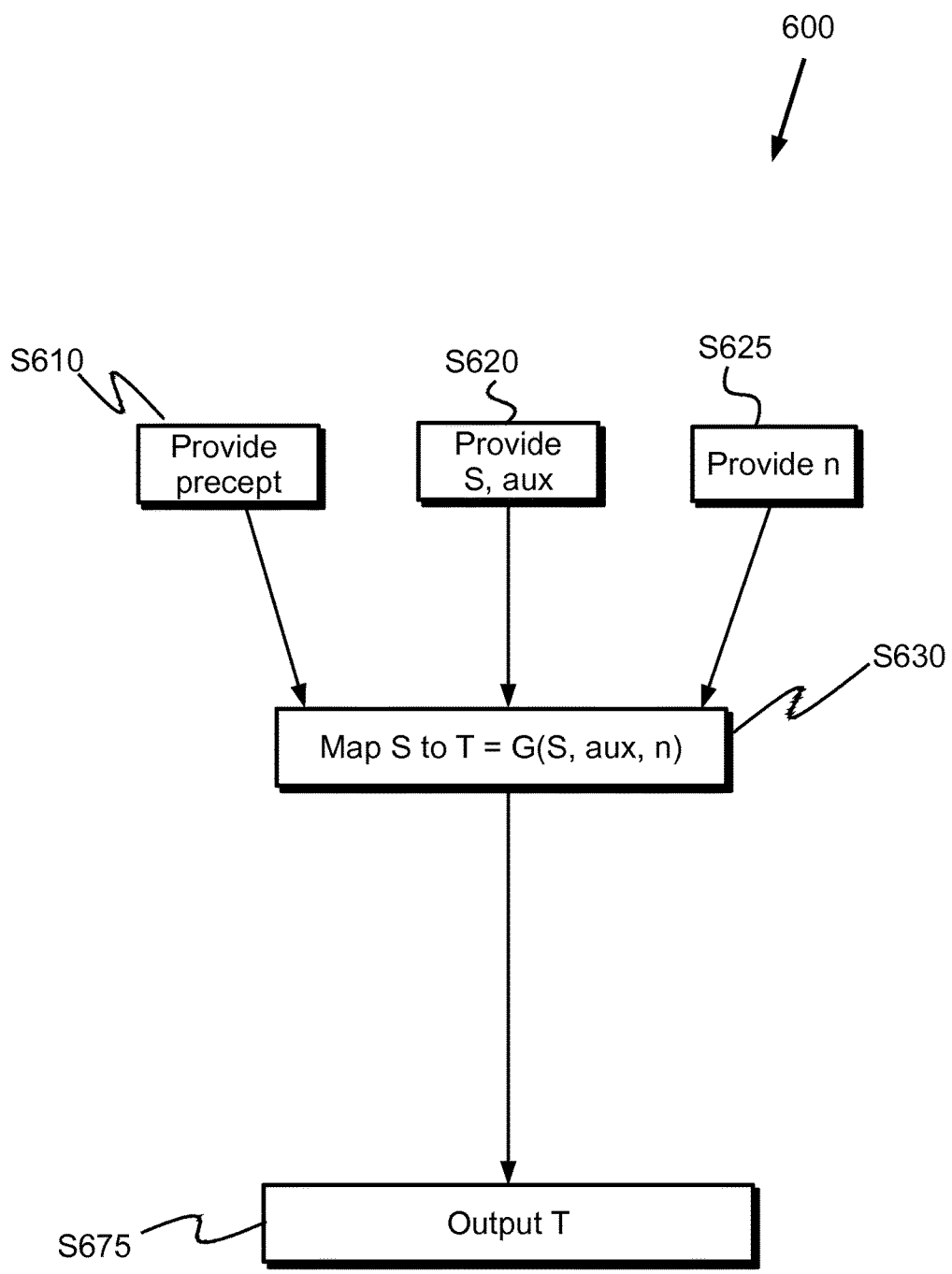
FIGS. 6A and 6B show two flow charts that illustrate variants of an exemplary method to regenerate a predetermined token T according to some embodiments.
Figure 6B:
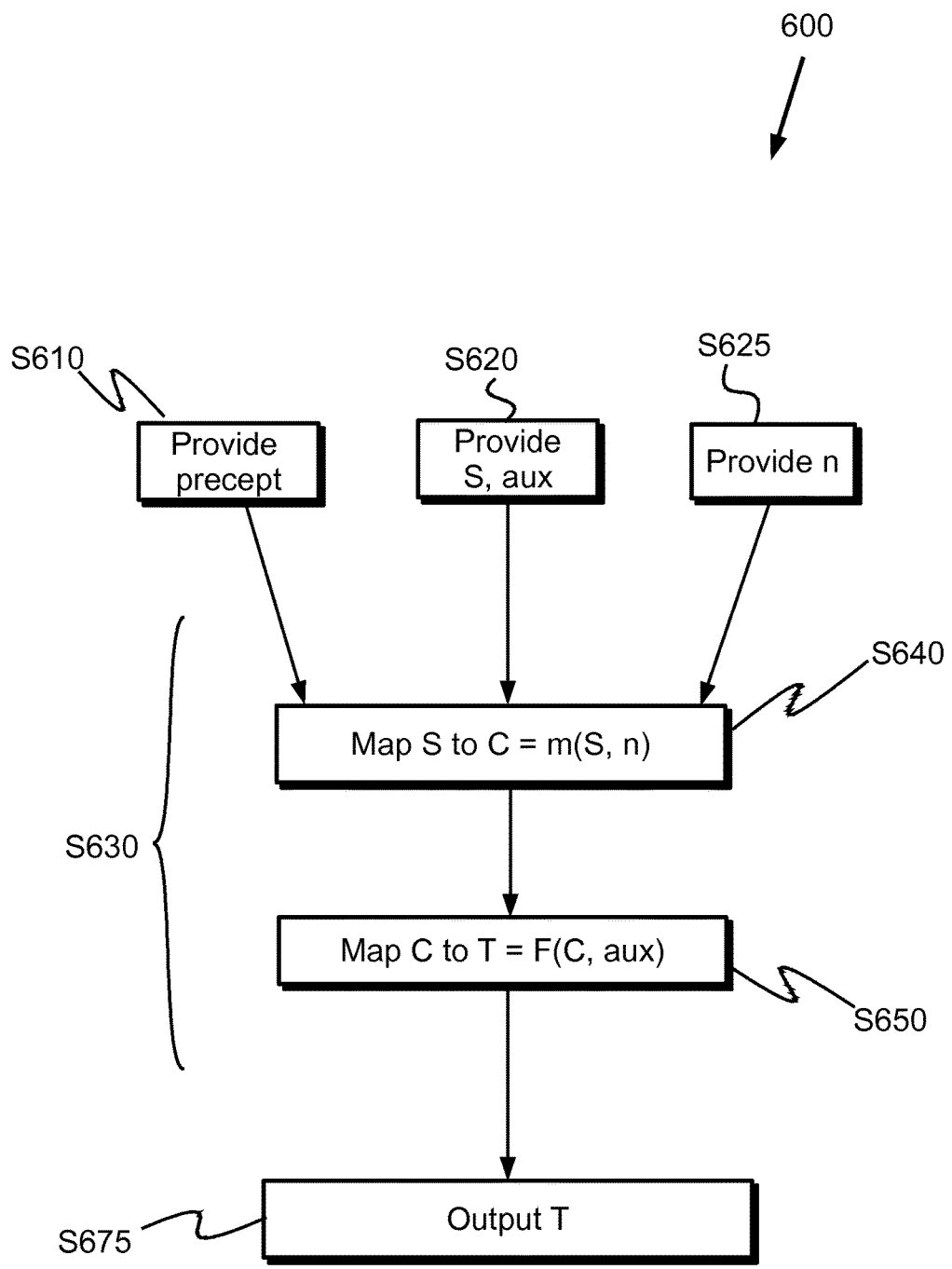

FIGS. 6A and 6B illustrate two variants of an exemplary method 600 to regenerate a token T according to some embodiments, wherein token T was predetermined, for example, according to method 500 performed by a user as described above with reference to FIG. 5. As a prerequisite to performing method 600, a precept is defined as a complement to the rule set defined for use in method 500. The precept is provided, at S610, for use in performing method 600. Herein, the rule set defined for use in method 500 is also referred to as first rule, while the precept defined for use in method 600 is referred to as second rule. The second rule matches with the first rule. In particular, the second rule uses the correlation, established when performing method 500 according to the first rule, of the value of auxiliary parameter aux with the value of confirmed token T. Other implementations may also be possible as long as the value of auxiliary parameter aux correlates with a number of candidate tokens C need to be provided in the process of regeneration according to the second rule or with a number of iterative tests performed to obtain confirmed token T from memento, i.e., in the embodiment of method 500 seed S.

In a first variant of method 600, illustrated in FIG. 6A, at S620, seed S and an auxiliary parameter aux are provided. For example, the values, i.e., bit representations, of memento S and auxiliary parameter aux are read, as the case may be, from some process register, buffer register, memory 130 or other place where these values were stored.

At S625, in some embodiments bit length n of a token T is provided.

At S630, memento S is mapped to token T=G(S, aux, n), wherein G is a function using S, aux and n as inputs. In order to match the rule set, function G also forms part of the associated precept.

In a second variant of method 600, illustrated in FIG. 6B, an iterative routine is performed to arrive at token T.

According to the second variant, at S610, a counter i is initialized. In some implementations the initialization encompasses an assignment of a register address, for example, in a register bank of CPU 110 or in memory 130, and setting a value at the register address to a predetermined value. For example, initialization in some embodiments includes setting the value of counter i to zero.

As according to the first variant, method 500 at S530, also in method 600 according to the second variant, now at S640 memento S is mapped to a candidate token C=m(S, n), wherein m is the function using S and n as inputs that was discussed above with reference to FIG. 4, S430, and that, in order to match the rule set, also forms part of the associated precept.

At S650, still according to the second variant, candidate token C is mapped to token T=F(C, aux), wherein F(C, aux) is some function defined in the precept that matches the rule set. Function F defines how to use candidate token C and auxiliary parameter aux, in order to arrive at the same token T that resulted from applying the rule set to according to method 500.

It should be understood that the mapping according to the second variant described above with reference to steps at S640 and S650 can also be expressed as a single mapping, at S630, of memento S to token T=F(m(S, n), aux), since, given the precept, memento S, bit length n and auxiliary parameter aux, token T is fully defined. In some embodiments mapping function F is iteratively updated, wherein auxiliary parameter aux determines updating of the mapping function, to map the candidate token C=m(S, n) that was first derived from memento S onto an updated candidate.

According to both, first and second variant of method 600, at S675, token T is output.

Figure 7:
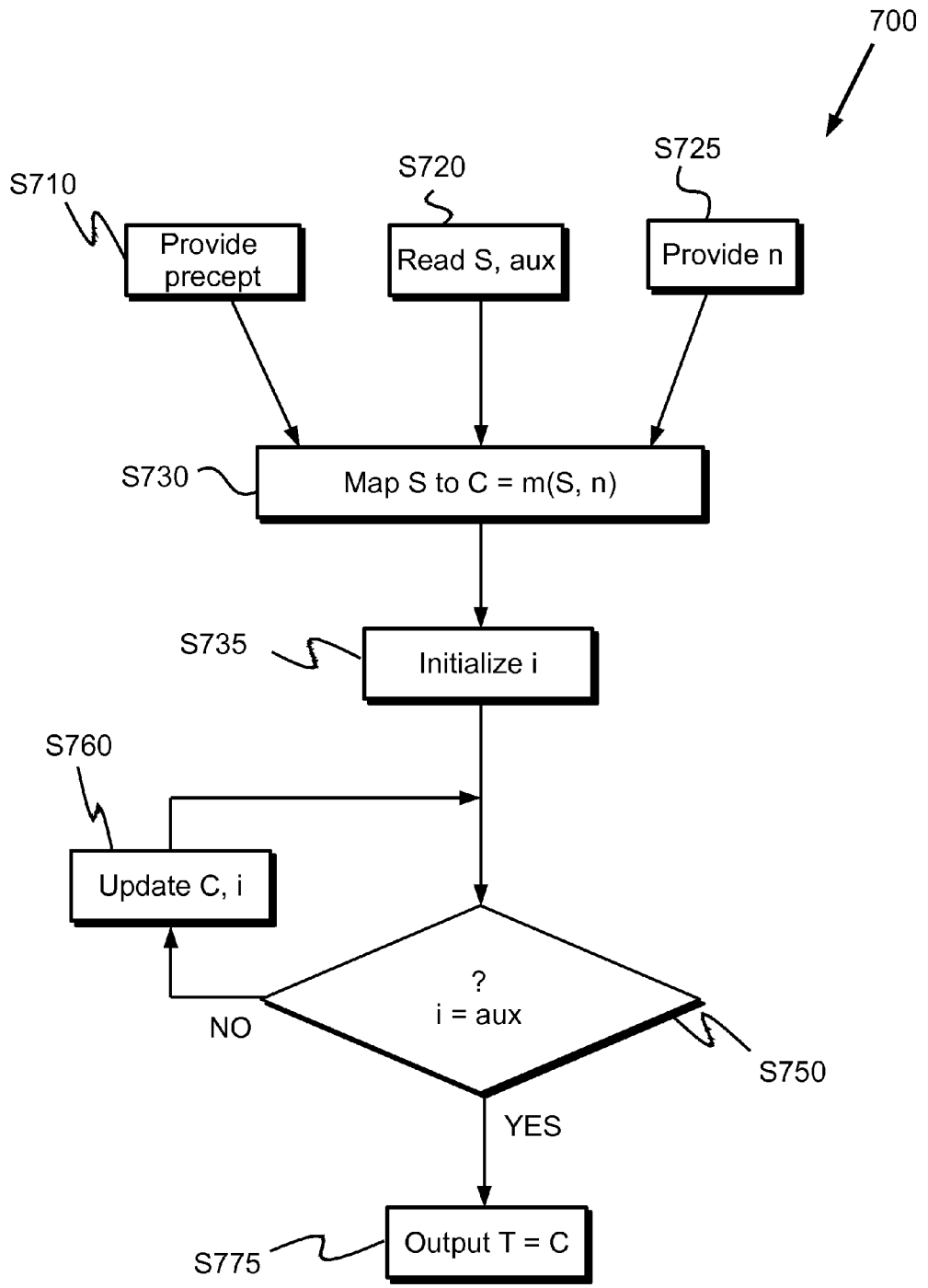
FIG. 7 is a flow chart that illustrates a method to determine a token T according to some embodiments.

FIG. 7 illustrates a method 700 to determine a token T according to some embodiments. Method 700 is an implementation of method 600 illustrated in FIG. 6. According to FIG. 7 illustrates a variant of method 600. More particularly, mapping of candidate token C to token T involves use of a counter i. At S735, counter i is initialized. At S750, the value of counter i is tested against the value of auxiliary parameter aux. If the value of counter i does not correspond to the value of auxiliary parameter aux, then candidate token C and correlated auxiliary parameter aux are updated.

At S760, updating of candidate token C and correlated auxiliary parameter aux are performed in accordance with the second rule. Updating of candidate token C provides an updated candidate token C:=f(C), wherein f is some function defined in the second rule, for example f(C)=C+2.

Still at S760, the value of counter i is also updated in order to obtain an updated value of counter i:=h(i), wherein h is some other function defined in the second rule. In some implementations, for example, the second rule defines function h to increment the value of counter i by 1, i.e., h(i)=i+1. In some implementations the updating, in method 700 at S760, of values of candidate token C and counter i, is the same as the updating, in method 500 at S560, of values of candidate token C and auxiliary parameter aux.

If, at S750, the value of counter i is found to match or otherwise correspond to the value of auxiliary parameter aux in accordance with the second rule, then candidate token C is confirmed as token T and output, at S775, for use, for example, in cryptographic operation.

It should be understood that repeated updating of C thus results in the mapping T=F(C, aux) that was discussed above with reference to FIG. 6, at S640. In other words F(C, aux)=f(f( . . . f(C) . . . ))=f^aux (C), wherein the value of auxiliary parameter aux determines how often f(C) is performed. In some embodiments, function F can be known and can form part of the precept. In some implementations, function F is therefore performed instead of iterations that use update function f.

While regeneration of token T can be performed by the same user that predetermined token T, in some embodiments that user can also act as a first correspondent and transmit the values of memento S and, in some implementations for fast regeneration also auxiliary parameter aux, to a second correspondent such that, for example, the second correspondent can regenerate token T. In embodiments where the bit representations of memento S and auxiliary parameter aux are smaller than the bit representation of token T, transmission bandwidth can thus be saved by transmitting the bit representations of memento S and auxiliary parameter aux instead of the bit representation of token T. Further, the second correspondent can save time and processing resources when regenerating token T, since instead of checking if the candidate token C meets the condition defined in the first rule set, the second correspondent can check if the value of counter i corresponds to, in some implementations equals, the value of auxiliary parameter aux.

Further implementations of using a seed S for first generating a prime P as token T and an auxiliary parameter aux, storing seed S as a memento and auxiliary parameter aux, and of regenerating the prime P, wherein seed S and the auxiliary parameter are used, will now be disclosed.

Figure 8:
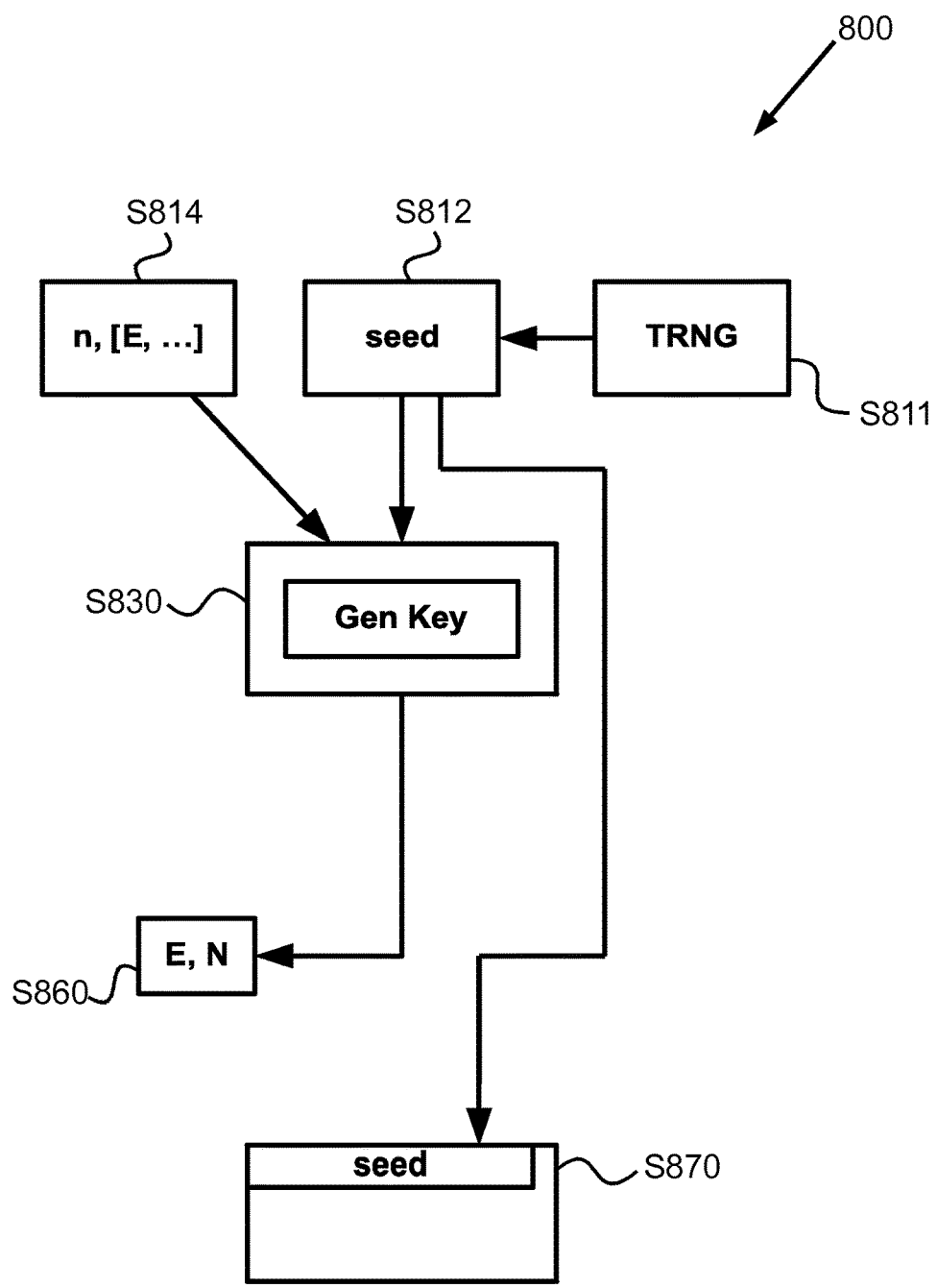
FIG. 8 is a flow chart that illustrates an exemplary method for providing a cryptographic key in accordance with some embodiments.

FIG. 8 is a flow chart that illustrates an exemplary method 800 for providing a secret key D for use in cryptographic operations, as described above, such as the operation of signing a message M and the operation of decrypting an encrypted message, i.e., ciphertext Ctxt that was encrypted using, for example, a public key E associated with secret key D, for example, to perform RSA cryptography. In some implementations method 800 is performed using hardware such as exemplary module 100 described above with reference to FIG. 1. At S811, random generator 118 generates a random bit pattern. At S812, the random bit pattern is used to determine a seed S. In other embodiments, at S812, the seed can be imported, for example using bus 120, from a source external to module 100. At S814, co-processor 114 or, in some implementations, CPU 110 provides values of other parameters such as bit length n of a bit representation of module N and, as the case may be, of other keys and/or key elements. At S830, co-processor 114 uses seed S as an input to generate key elements such as first prime number P and second prime number Q. At S860, co-processor 114 outputs public key E and key element N to CPU 110. Using bus 120, CPU 110 can output multi-component public key (E, N) from card module 100. At S870, the seed is stored as a memento for future use, for example, in a secure portion of memory 130. Using the seed in future calculations can be useful to regenerate the keys as generated, at S830.

Figure 9:
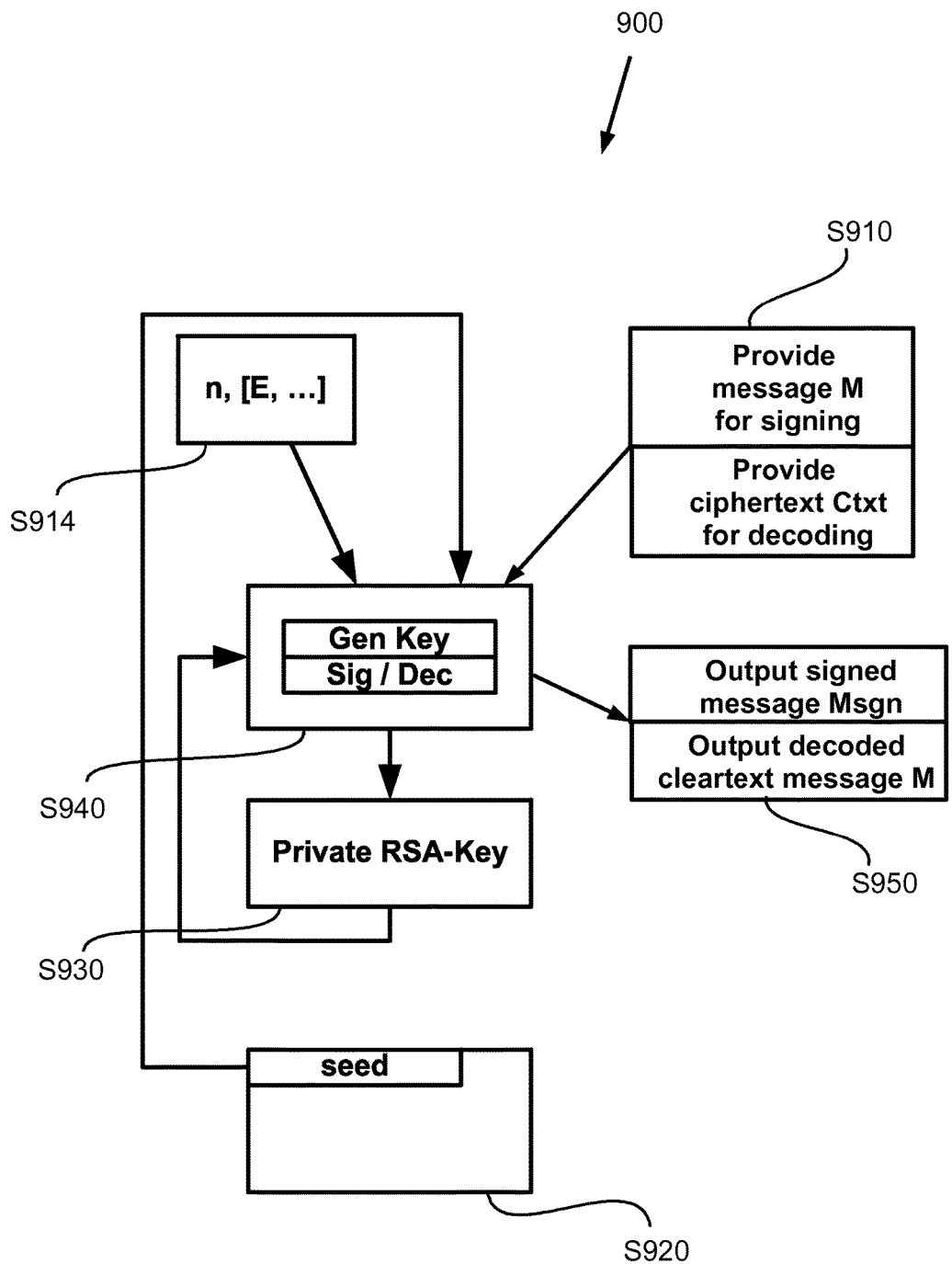
FIG. 9 is a flow chart that illustrates an exemplary method of using a cryptographic key provided in accordance with the method of FIG. 8 to sign a message.

FIG. 9 is a flow chart that illustrates an exemplary method 900 of using cryptographic key D provided at a correspondent in accordance with method 800 illustrated in FIG. 8 to sign a message M so as to obtain a signed message Msgn. At S914, key length n is obtained, for example, by being read from memory 130. At S920, seed S is obtained, for example, by being read from memory 130. At S940, the bit representation of secret key D, herein also referred to as "predetermined secret key D", that was previously determined when performing method 800 is, again, determined to be provided as a token, in some embodiments, for use in RSA cryptography. Similarly, at S940, in some embodiments module N is re-generated. Still at S940, message M is used to obtain a signature S and, using signature S, message M is signed to obtain, at S750, signed message Msgn, for example, for transmission to another correspondent.

A variant of method 900 can be used to decrypt an encrypted message, i.e., ciphertext Ctxt. At S910, the correspondent receives ciphertext Ctxt from another correspondent. At S914, key length n is obtained, for example, by being read from memory 130 or, in some implementations, from some buffer memory storing data received from the another correspondent. At S920, the seed is read from memory 130 or from the buffer memory storing data received from the another correspondent. At S940, predetermined secret key D is, again, determined to be provided as private key for use in RSA cryptography. Still at S940, encrypted message Ctxt is decrypted to obtain a cleartext message M.

Figure 10A:
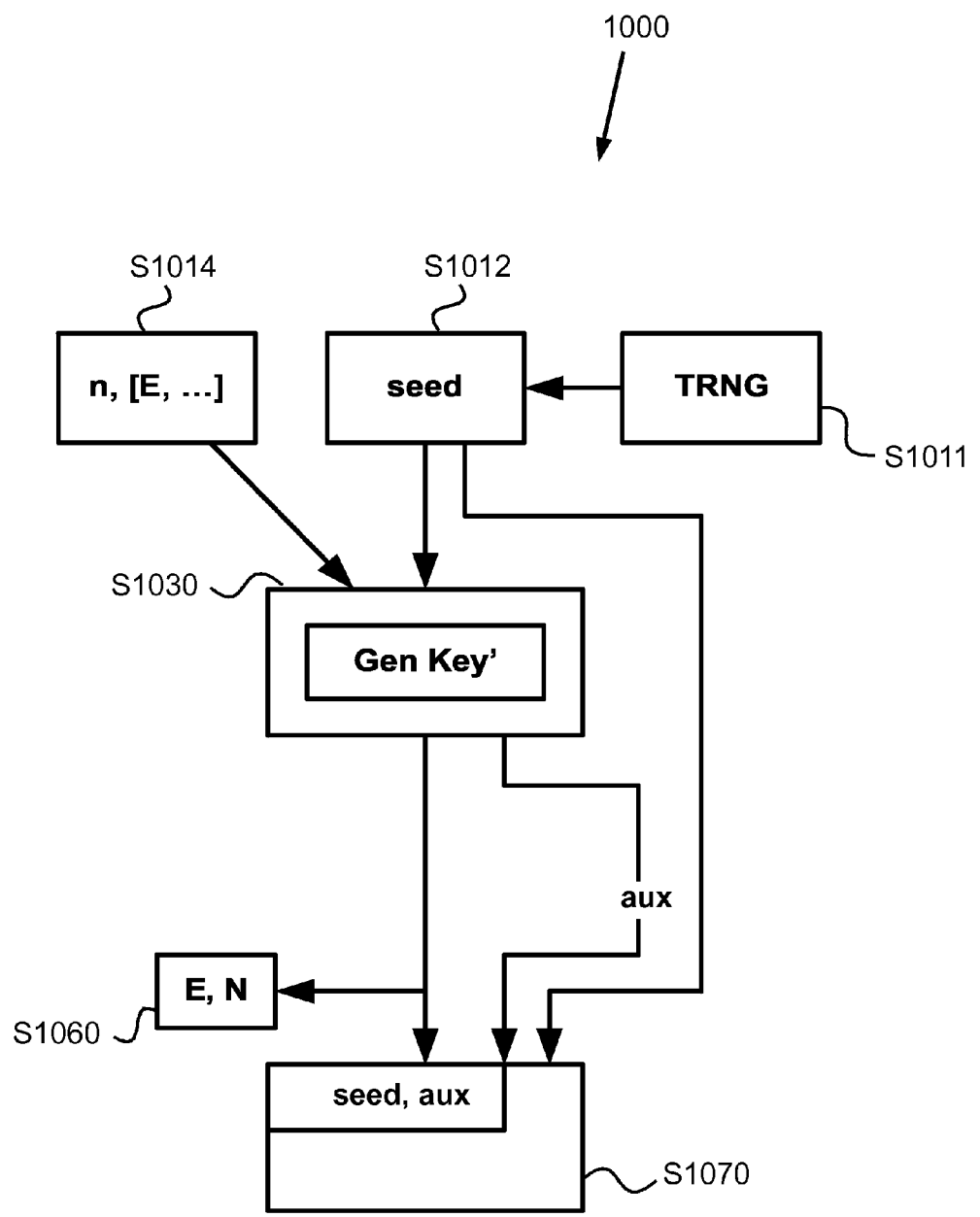
FIG. 10A is a flow chart that illustrates an exemplary method for providing a secret key D for use in cryptographic operations.

FIG. 10A is a flow chart that illustrates another exemplary method 1000 for providing a secret key D for use in cryptographic operations, as described above, such as the operation of signing a message M and the operation of decrypting an encrypted message C that was encrypted using, for example, a public key E associated with secret key D, in accordance, for example, with RSA cryptography. Method 1000 is, in fact a variant of method 800 described above with reference to FIG. 8. At S1011, random generator 118 generates a random bit pattern. At S1012, the random bit pattern is used to determine a seed. In other embodiments, at S1012, the seed can be imported, for example using bus 120, from a source external to module 100. At S1014, co-processor 114 or, in some implementations, CPU 110 provides values of other parameters such as bit length n of a bit representation of module N and, as the case may be, of other keys and/or key elements. At S1030, co-processor 114 uses the seed as an input to generate key elements such as first prime number P and second prime number Q. As will be seen below with reference to FIG. 10B, when generating key elements, module 100 applies a given rule for generating a bit representation of secret key D on the basis of the seed and taking into account key length n. Thus mapping the seed to the bit representation of private key D, values of at least one auxiliary parameter aux are modified or stepped through. Having predetermined the bit representation of secret key D, at S1030, the value of auxiliary parameter aux is determined. Where more than a single component is needed, such as two primes in RSA, accordingly more than one auxiliary parameter aux_P, aux_Q are associated with the respective token or prime, and values of the multiple parameters aux_P, aux_Q can be individually determined to differ from one another. Herein, where token T encompasses multiple components such as first prime P and second prime Q, reference to auxiliary parameter aux is meant to encompass auxiliary parameter aux_P and auxiliary parameter aux_Q. At S1060, co-processor 114 outputs public key E and key element N to CPU 110. Using bus 120, CPU 110 can output multi-component public key (E, N) from module 100. At S1070, the seed can be stored as a memento S for future use, for example, in a secure portion of memory 130. Still at S1070, the value of auxiliary parameter aux can also be stored for future use. Using seed in future calculations in combination with the value of auxiliary parameter aux can be useful to regenerate the keys.

Figure 10B:
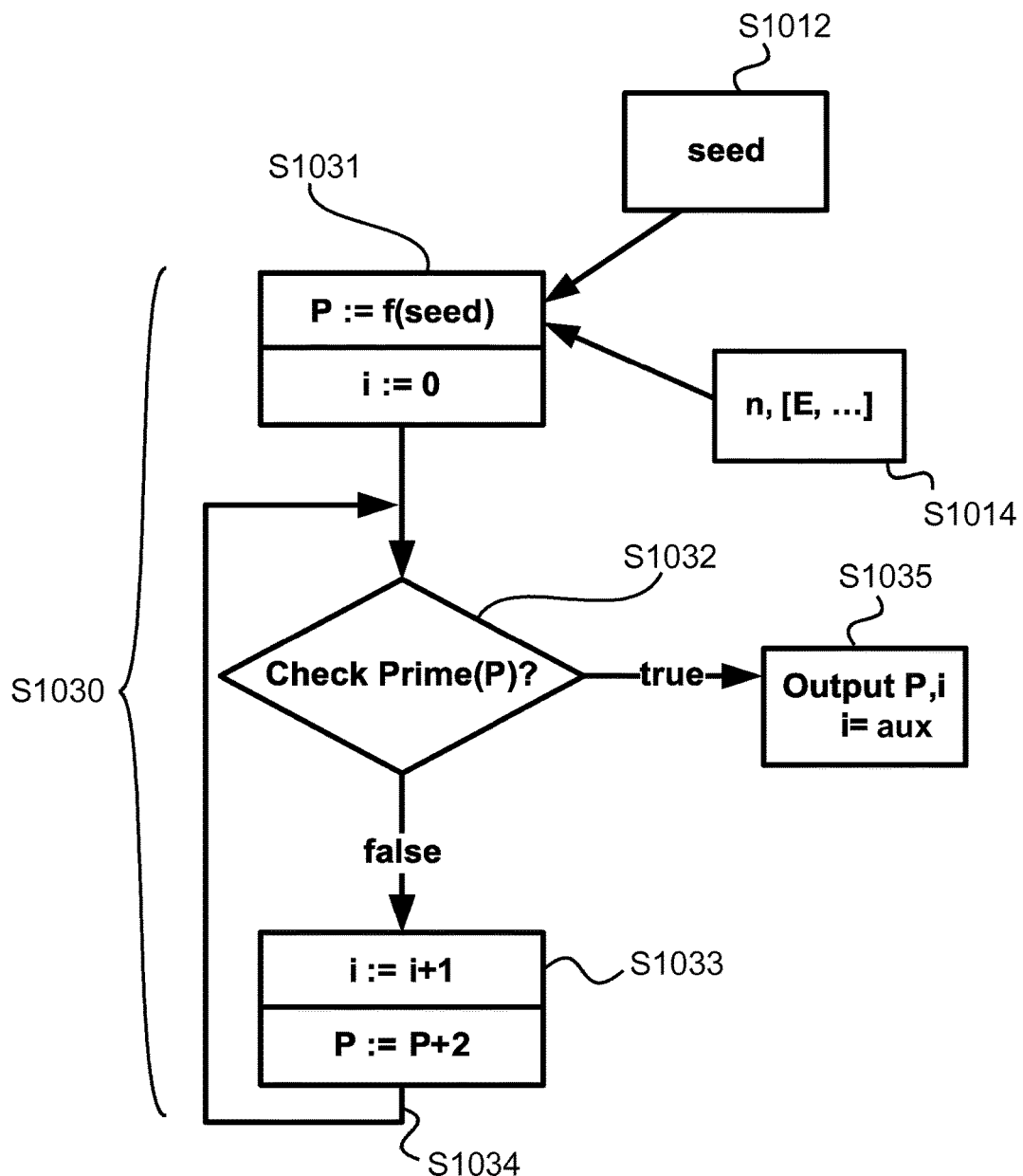
FIG. 10B is a flow chart that illustrates an exemplary method of generating a prime number for use in the method illustrated in FIG. 10A.

FIG. 10B is a flow chart that illustrates an exemplary method of generating, at S1030, for example a prime number such as first prime number P and/or second prime number Q. At S1014, co-processor 114 or, in some implementations, CPU 110 provides values of key length n and, as the case may be, of other parameters. Having also provided, at S1012, seed S, now at S1031, a bit representation of seed S is expanded according to some given function f(seed) to obtain a first candidate prime number having a bit representation with a length equal to the key length n. Still at S1031, a counter is initialized; for example, a value i is set to zero. At S1032, the candidate prime number is tested against the condition that the represented number be prime. If true, at S1035, the candidate prime number is determined as prime number P and output for processing to be continued, for example, at S1040, as described above. In addition, value i of the counter is output as an auxiliary parameter aux. If false, the first candidate prime number, at S1033, is updated to form a second candidate prime number. For example, the candidate prime number is incremented by 2 to obtain a new candidate prime number. In addition, still at S1033, the value i of the counter is, for example, incremented by 1 to reflect that one update of the candidate prime number was performed. The second candidate prime number, at S1034, to be fed back for a new round of testing at S1032. Rounds of testing the candidate prime number, updating the candidate prime number to obtain a new candidate prime number, incrementing value i of the counter and feedback of the new candidate prime number, are performed until the condition of the new candidate prime number being determined to be prime is met, whence, at S1035, the new candidate prime number is output as prime number P for further processing, and whence value i of the counter is output as auxiliary parameter aux. From the above description it should be understood that also other ways to obtain auxiliary parameter aux than the described increment of the counter can be contemplated.

Figure 11A:
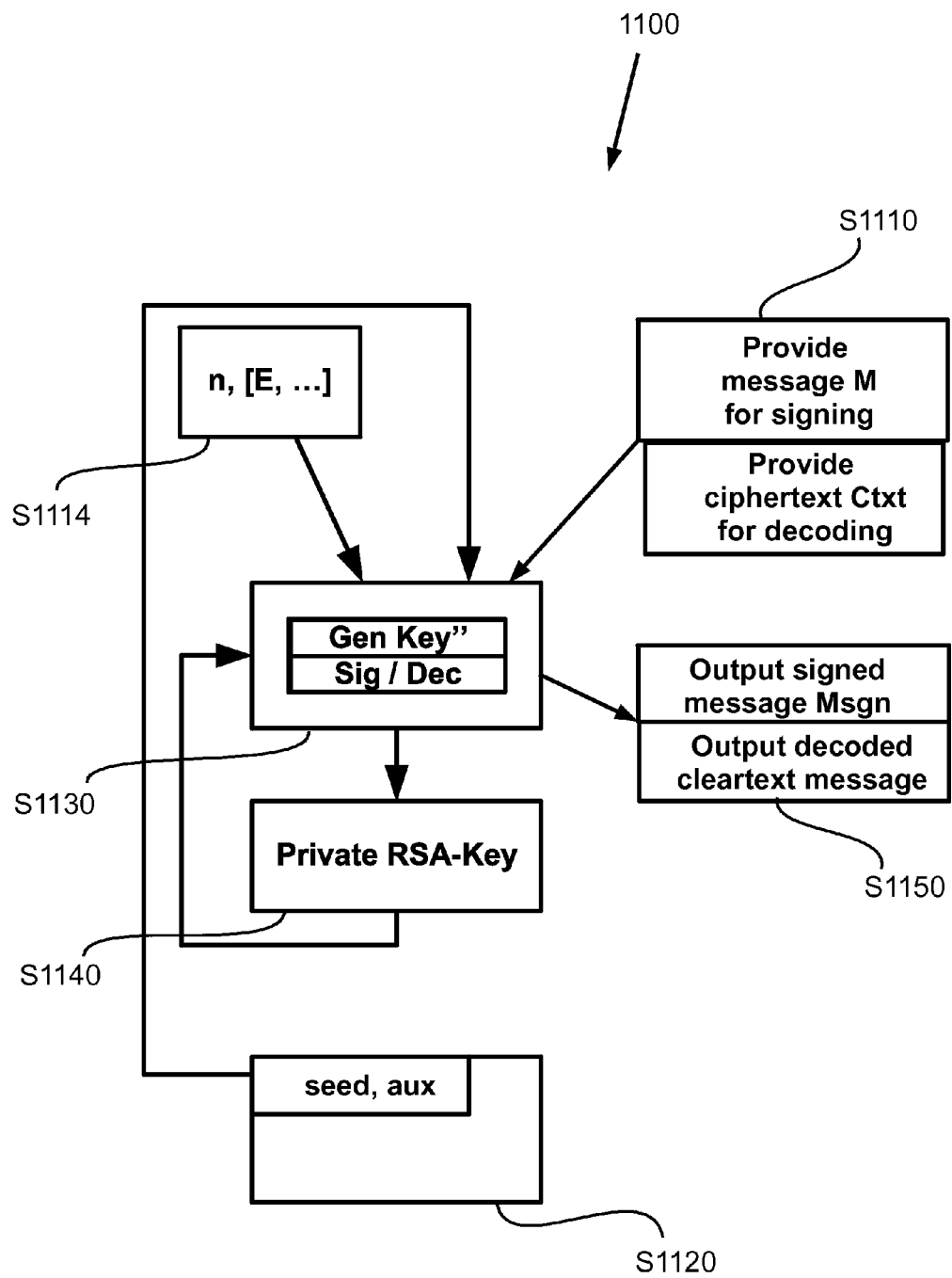
FIG. 11A is a flow chart that illustrates an exemplary method of using cryptographic keys.

FIG. 11A is a flow chart that illustrates an exemplary method 1100 of using cryptographic keys D, E provided at a correspondent in accordance with method 1000 of FIGS. 10A and 10B to sign a message M so as to obtain a signed message S. Method 1100 is a variant of method 900 described above with reference to FIG. 9. At S1114, key length n is obtained, for example, by being read from memory 130. At S1120, both the seed and the value of auxiliary parameter aux, or, if there are multiple auxiliary parameters aux_P, aux_Q, a plurality of auxiliary parameter values are obtained, for example, by being read from memory 130. At S1130, the bit representation of predetermined secret key D that was previously determined when performing method 1000 illustrated in FIG. 10, is, again, determined, now according to a given precept, herein also referred to as second rule, that is based on auxiliary parameter aux. At S1140, the bit representation is provided as private key D as a token for use in RSA cryptography. In some implementations message M is used to obtain a signature and, using signature, message M is signed to obtain, at S1150, signed message Msgn, for example, for transmission to another correspondent. In some implementations method 1110 is used to decrypt an encrypted message, i.e., ciphertext Ctxt. At S1110, the correspondent receives ciphertext Ctxt from the another correspondent. At S1114, key length n is read from memory 130. At S1120, values of seed and auxiliary parameter aux are obtained, for example, by being read from memory 130. At S1130, predetermined secret key D is, again, determined to be provided, at S1140, as a private key for use in RSA cryptography. Still at S1130, ciphertext C is decrypted to obtain a cleartext message M.

Figure 11B:
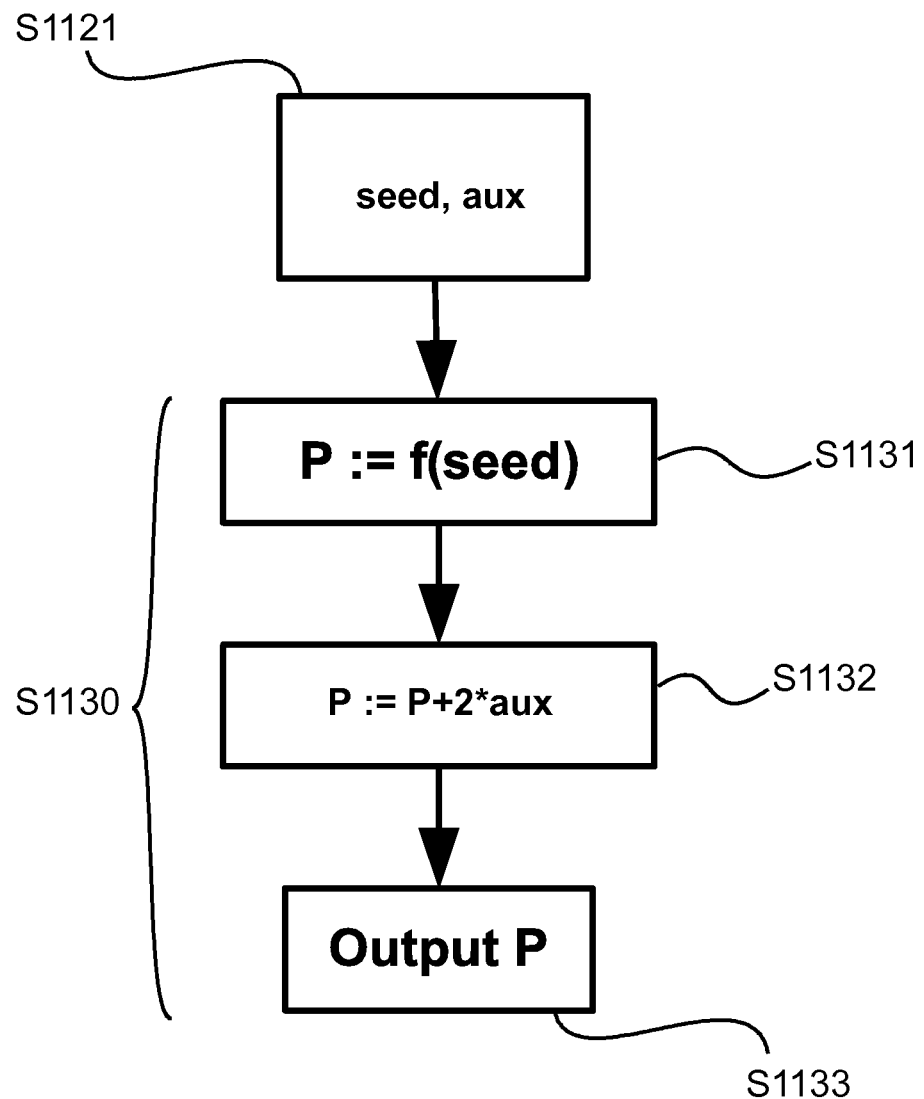
FIG. 11B is a flow chart that illustrates an exemplary method of regenerating a representation of a prime number as a token for use in the method illustrated in the flow chart of FIG. 11A.

FIG. 11B is a flow chart that illustrates an exemplary method of regenerating a representation of a prime number as a token for use in the method illustrated in the flow chart of FIG. 11A. As described above, at S1120, both the seed and the value of auxiliary parameter aux are obtained, for example, by being read from memory 130. As further described above, at S1130, the bit representation of predetermined secret key D is again determined, i.e., re-generated according to the second rule. The second rule can include a prescription, i.e., function f, that defines how to obtain, from the seed, an intermediate representation whose bit length is equal to the bit length of the token to be re-generated. Further, the second rule can define an update function such as (expressed in pseudo code) P:=P+2*a, wherein P is variable for the bit representation of the token, and a is a variable for the value of auxiliary parameter aux. According to this example, regenerating the token, i.e., prime number P, is thus performed by first, at S1131, mapping the seed to a bit representation of the length of the token to be regenerated and then, at S1132, adding a product of counter increment times number of iterations as used and performed when first generating the prime number P for use as a token, so that the prime number P, at S1133, is obtained for output. It should be noted that in typical implementations, where the bit representation of the seed has a length smaller than the length of the bit representation of the token to be re-generated, a ratio of entropy to length of the seed's bit representation is larger than a ratio of entropy to length of the token's bit representation. At least one effect is that storing the seed (and auxiliary parameter aux) can require less memory than storing the token itself.

In a further aspect common to some embodiments, a method comprises providing a memento, mapping the memento to a candidate token according to a rule that updates a parameter, the rule herein also being more specifically referred to as first rule, predetermine the token to be the candidate token, if the candidate token meets a test condition according to the first rule, identifying a parameter value of the parameter, and providing the memento and the parameter value for future use as an input to re-generate the token. At least one effect can be to enable efficient storage of information representative of the token for later use. Another effect can be to enable efficient transmission of information representative of the token to save transmission bandwidth. Yet another effect can be a reduction of processing time used to regenerate the predetermined token in later use. Also, processing characteristics of prime number tests can be avoided. Thus, resistance of the predetermined token to attack, for example by side channel observation, is increased.

According to some implementations the parameter is a counter configured to count a number of iterations performed in mapping the memento to the candidate token. In some embodiments each iteration comprises mapping a first candidate value derived from the memento to a second candidate value to form the candidate token. In some implementations the memento is random. At least one effect can be to enable application of the method in cryptography, for example, with the predetermined token forming at least part of a secret key in RSA. In some implementations the predetermined token can be public. At least one effect can be to enable a first correspondent having information related to or even representative of the predetermined token to transmit this information via an insecure channel to a second correspondent. The second correspondent may use the information to obtain the predetermined token.

According to some embodiments the mapping comprises expanding a bit representation of the memento to a first representation having a bit length of a second representation configured to represent the token. In some implementations the expanding the bit representation of the memento includes generating a first number using the memento as a seed value. At least one effect can be to use the seed value in order to generate a pseudo-random number for use in predetermining the prime number. In some implementations a ratio of entropy to length of the first representation is larger than a ratio of entropy to length of the second representation. At least one effect can be to enable particularly efficient storage and/or transmission of information useful to obtain the predetermined number, since the second representation can be "compressed", i.e., represented by the first representation wherein the first representation can be more concise and accordingly can use less resources than the second representation. For example, a bit length of the first representation can be smaller than a bit length of the second representation.

In some embodiments the test condition according to the first rule is that the token be prime. At least one effect can be to use the method as a prime number generator. In some implementations the token is for use in generation of a secret key in RSA encryption. In some implementations the test condition includes the token minus 1 to be relatively prime to a public key associated with the secret key. At least one effect can be to enable efficient providing of components for use in generating the public key.

In another aspect a method is provided to re-generate a predetermined token for use in a cryptographic system. The method comprises providing a memento associated with the predetermined token, providing a parameter value associated with the predetermined token, providing a precept, herein also referred to as second rule, for mapping, based on the parameter value, the memento to a candidate token, and applying the second rule to identify the predetermined token as the candidate token. At least one effect can be to enable use of a token that was provided as information that efficiently represented the token to save resources, in particular, in terms of memory for storage of information representative of the predetermined token and/or bandwidth for transmission of information representative of the predetermined token.

It should be understood that, though the skilled person can freely design the second rule, the freedom of design is still limited by the first rule. If, for example, the first rule included an iteration with the parameter value being set to a counter value incremented with each round of iteration, then the second rule must be structured so as to provide the same result. In one example the second rule can provide for performing a number of iterations equal to the parameter value wherein an increment of a counter value in each iteration is as was provided for according to the first rule. In another example, the number of iterations performed according to the second rule is traded off against size of increment when incrementing a counter value according to the second rule. In one example, according to the second rule only one increment is performed wherein the size of increment is equal to the parameter value.

In some implementations the token can have been predetermined at a first correspondent whereas the applying the rule to identify the predetermined token is performed at a second correspondent. Thus, some embodiments comprise transmitting the memento and the parameter value from the first correspondent to the second correspondent.

In yet another aspect a non-transitory computer-readable medium is provided. In some embodiments instruction code is stored on the medium that when executed causes one or more processors to perform one or more steps, to generate, meeting a first condition, a token from a memento and to determine a parameter value associated with the token. In some implementations the method to generate the token comprises providing the memento, and applying a first rule for mapping the memento to a candidate token, wherein the first rule includes at least the first test condition to identify the candidate token as the token. In some embodiments the non-transitory computer-readable medium is provided with instruction code stored thereon that when executed causes one or more processors to perform one or more steps to re-generate the token using the parameter value to meet a second condition. In some embodiments the method to re-generate the token comprises providing the memento, and applying a second rule for mapping the memento to the candidate token, wherein the second rule includes the second test condition to identify the candidate token as the token. In some implementations the parameter value is a counter value indicative of a number of iterations performed in generating the token. In an implementation each iteration comprises mapping a first candidate value derived from the memento to a second candidate value to form the candidate token. According to some embodiments the memento is random. In some implementations the mapping comprises expanding a bit representation of the memento to a first representation having a bit length of a second representation configured to represent the token. In some embodiments the expanding the bit representation of the memento includes generating a first number using the memento as a seed value. In some implementations the first condition is that the token be prime. According to some embodiments the token is for use in generation of a secret key in RSA encryption.

In a further aspect a medium is provided having stored thereon a procedural representation of a token. The procedural representation includes a memento, a parameter value and a rule that defines how to process the memento while using the parameter value to obtain a conventional representation of the token. According to some embodiments the procedural representation is distributed across a plurality of nodes and/or items each having a medium for storing a component of the distributed representation. In some implementations the rule is stored in a first medium associated with a node while the memento and/or the parameter value is stored in a second medium associated with an item adapted to cooperate with the node.

Exemplary implementations/embodiments discussed herein may have various components collocated; however, it should be appreciated that the components of the arrangements may be combined into one or more apparatuses.

Although the disclosure has been shown and described with respect to one or more implementations, equivalent alterations and modifications will occur to others skilled in the art based upon a reading and understanding of this specification and the annexed drawings. Permutations and combinations of the above-disclosed concepts are also contemplated as falling within the scope of the disclosure. The disclosure includes all such modifications and alterations and is limited only by the scope of the following claims. In particular with regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application.

The implementations, arrangements, procedures and protocols of the described implementations may be implemented on a special purpose computer, a programmed microprocessor or micro-controller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable device, or the like. In general, any apparatus that is capable of implementing the methodology described and illustrated herein may be used to implement the various communication methods, protocols and techniques according to the implementations.

Furthermore, the disclosed embodiments, implementations and procedures, with the exception of registers, may be readily implemented in software using object or object-oriented software development environments that provide a portable source code that can be used on a variety of computer platforms. Alternatively, the disclosed arrangements may be implemented partially or fully in hardware using standard logic circuits or VLSI design.

Moreover, the disclosed procedures may be readily implemented in software that can be stored on a non-transitory computer-readable storage medium, executed on a programmed general-purpose computer with the co-operation of a controller and memory, a special purpose computer, a microprocessor, or the like. In these instances, the arrangements and procedures of the described implementations may be implemented as a program embedded on a personal computer such as an applet, JAVA® or CGI script, as a resource residing on a server or computer workstation, as a routine embedded in a dedicated communication arrangement or arrangement component, or the like. The arrangements may also be implemented by physically incorporating the arrangements and/or procedures into a software and/or hardware system.

The implementations herein are described in terms of exemplary embodiments. However, it should be appreciated that individual aspects of the implementations may be separately claimed and one or more of the features of the various embodiments may be combined. In the above description of exemplary implementations, for purposes of explanation, specific numbers, materials configurations, and other details are set forth in order to better explain the invention, as claimed. However, it will be apparent to one skilled in the art that the claimed invention may be practiced using different details than the exemplary ones described herein. In other instances, well-known features are omitted or simplified to clarify the description of the exemplary implementations. Thus, although the disclosure has been shown and described with respect to one or more implementations, equivalent alterations and modifications will occur to others skilled in the art based upon a reading and understanding of this specification and the annexed drawings.

The inventors intend the described exemplary embodiments/implementations to be primarily examples. The inventors do not intend these exemplary embodiments/implementations to limit the scope of the appended claims. Rather, the inventors have contemplated that the claimed invention might also be embodied and implemented in other ways, in conjunction with other present or future technologies. Note that the order in which the embodiments/implementations and methods/processes are described is not intended to be construed as a limitation, and any number of the described implementations and processes may be combined.

The word 'exemplary' is used herein to mean serving as an example, instance, or illustration. Any aspect or design described herein as 'exemplary' is not necessarily to be construed as preferred or advantageous over other aspects or designs. Rather, use of the word exemplary is intended to present concepts and techniques in a concrete fashion. The term 'techniques', for instance, may refer to one or more devices, apparatuses, systems, methods, articles of manufacture, and/or non-transitory computer-readable instructions as indicated by the context described herein.

In addition, the articles 'a' and an as used in this application and the appended claims are to be construed to mean one or more'. As used in this application, the term or is intended to mean an inclusive or rather than an exclusive 'or'. That is, unless specified otherwise or clear from context, 'X employs A or B' is intended to mean any of the natural inclusive permutations. That is, if X employs A; X employs B; or X employs both A and B, then 'X employs A or B' is satisfied under any of the foregoing instances. Furthermore, to the extent that the terms 'includes', 'having', 'has', 'with', or variants thereof are used in either the detailed description or the claims, such terms are intended to be inclusive in a manner similar to the term 'comprising'.

The term 'processor-readable media' includes processor-storage media. For example, processor-storage media may include, but are not limited to, magnetic storage devices (e.g., hard disk, floppy disk, and magnetic strips), optical disks (e.g., compact disk (CD) and digital versatile disk (DVD)), smart cards, flash memory devices (e.g., thumb drive, stick, key drive, and SD cards), and volatile and non-volatile memory (e.g., random access memory (RAM), read-only memory (ROM)).

For the purposes of this disclosure and the claims that follow, the terms 'coupled' and 'connected' may have been used to describe how various elements interface. Such described interfacing of various elements may be either direct or indirect.

What is claimed is:

1. A computer implemented method comprising a hardware processor to predetermine a token for use in a cryptographic system, the method comprising:
   providing a memento;
   mapping, by the hardware processor, the memento to a candidate token according to a rule that updates a parameter;
   predetermining the token to be the candidate token, if the candidate token meets a test condition according to the rule;
   identifying a parameter value of the parameter; and
   providing the memento and the parameter value for future use as an input to re-generate the token, wherein the parameter is a counter configured to count a number of iterations performed in mapping the memento to the candidate token.

2. The method of claim 1, wherein each iteration comprises mapping a first candidate value derived from the memento to a second candidate value to form the candidate token.

3. The method of claim 1, wherein the memento is random.

4. The method of claim 1, wherein the mapping comprises:
   expanding a bit representation of the memento to a first representation having a bit length of a second representation configured to represent the token.

5. The method of claim 4, wherein expanding the bit representation of the memento comprises generating a first number using the memento as a seed value.

6. The method of claim 4, wherein a ratio of entropy to length of the first representation is larger than a ratio of entropy to length of the second representation.

7. The method of claim 1, wherein the test condition according to the rule is that the token be prime.

8. The method of claim 7, wherein the token is for use in generation of a secret key in RSA encryption.

9. The method of claim 8, wherein the test condition includes the token minus 1 to be relatively prime to a public key associated with the secret key.

* * * * *